INVENTOR
CARROLL H. VANHARTESVELDT
BY Olsen and Stephenson
ATTORNEYS

OXIDE THICKNESS FORMED IN VARIOUS TIMES AT SEVERAL TEMPERATURES

PLOT OF THE SQUARE OF OXIDE THICKNESS VERSUS OXIDATION TIME AT SEVERAL TEMPERATURES

Oct. 29, 1968                C. H. VAN HARTESVELDT                3,408,236
WEAR-RESISTANT TITANIUM ALLOY AND METHOD OF PRODUCING SAME
Filed May 3, 1965                                              4 Sheets-Sheet 3

INVENTOR
CARROLL H. VANHARTESVELDT

BY Olsen and Stephenson
ATTORNEYS

RESULTS OF AXIAL-LOAD FATIGUE TESTS ON WELDED SAMPLES THERMALLY EXPOSED IN ARGON

RESULTS OF AXIAL-LOAD FATIGUE TEST ON WELDED Ti-6Al-4V SHEET NO. 109 OXIDIZED AT 1200 F

United States Patent Office 3,408,236
Patented Oct. 29, 1968

3,408,236
WEAR-RESISTANT TITANIUM ALLOY AND
METHOD OF PRODUCING SAME
Carroll H. Van Hartesveldt, Toledo, Ohio, assignor to Hoover Ball and Bearing Company, Saline, Mich., a corporation of Michigan
Continuation-in-part of application Ser. No. 383,199, July 16, 1964. This application May 3, 1965, Ser. No. 452,639
8 Claims. (Cl. 148—6.3)

ABSTRACT OF THE DISCLOSURE

A continuous sheet metal belt is formed from the titanium alloy Ti-6Al-4V and is heat treated in an oxidizing atmosphere to form a wear-resistant surface without impairing the physical properties of the alloy.

---

This invention relates to a process for producing a superior wear-resistant surface on a titanium alloy without degrading the mechanical properties of the alloy. In particular, it relates to a process for making a titanium alloy suitable for use as a continuous belt or for other applications where the alloy must pass over a bearing surface for extended periods of time at moderate temperatures and at high levels of stress which promote fatigue failure. One example of apparatus requiring a continuous belt of this character can be found in pending application Ser. No. 70,498, filed Nov. 21, 1960, now Patent No. 3,159,526. The present application is a continuation-in-part of pending U.S. application Ser. No. 383,199, filed July 16, 1964, now abandoned.

Continuous belts of metal find use for many processing operations. A typical application is the processing of nonmetalic laminates where the nature of the processing operation requires materials to operate at 420° F. In addition to the exposure to heat, the belts must pass over a bearing surface with a minimum amount of wear. An example of a bearing surface with which the belt may be used can be found in pending U.S. application Ser. No. 314,068, filed Oct. 4, 1963, now abandoned, or which can be found in U.S. Letters Patent No. 3,282,311, granted Nov. 1, 1966. For adequate resistance to wear, belts with a hard surface are needed. At the same time, the production of a hard surface on the belts should not cause the fatigue strength of the belts to deteriorate at the processing temperature. This is of particular importance because the design of apparatus using continuous belts usually results in stress levels applied to the belts which approach the stresses at which fatigue failure can occur.

Because of its desirable mechanical properties, including fatigue strength, titanium has received considerable attention for applications such as continuous belts. In the prior art, methods such as carburizing, oxidizing, hydriding, induction hardening, cyanonitriding, boriding and nitriding have been used to obtain a hard surface of titanium. The use of these methods has invariably resulted in hard surfaces which are also brittle. The desirable level of hardness for good resistance to wear is achieved, but fatigue strength is impaired. An inherent disadvantage of the oxidized titanium is its poor fatigue strength. This low fatigue strength causes poor service life of oxidized titanium used for applications such as continuous belts.

One of the objects of this invention is to provide a method of preparing a titanium alloy article which has a surface of hard oxide, having a uniform depth into a titanium alloy core produced by inexpensive and simple treatment and which retains or exceeds the fatigue strength characteristic of the titanium alloy in the nonoxidized condition.

Another object of the invention is to provide an article of manufacture for use in continuous processing at moderate temperatures where resistance to wear and resistance to failure by fatigue are important considerations.

Still another object of this invention is to provide a titanium alloy article for use as a bearing surface which can be subjected to higher levels of stress without fatigue, thereby increasing the capacity of the apparatus in which it operates.

Other objects of this invention will appear in the following description and appended claims, reference being had to the accompanying drawings forming a part of this specification.

Figure 1:
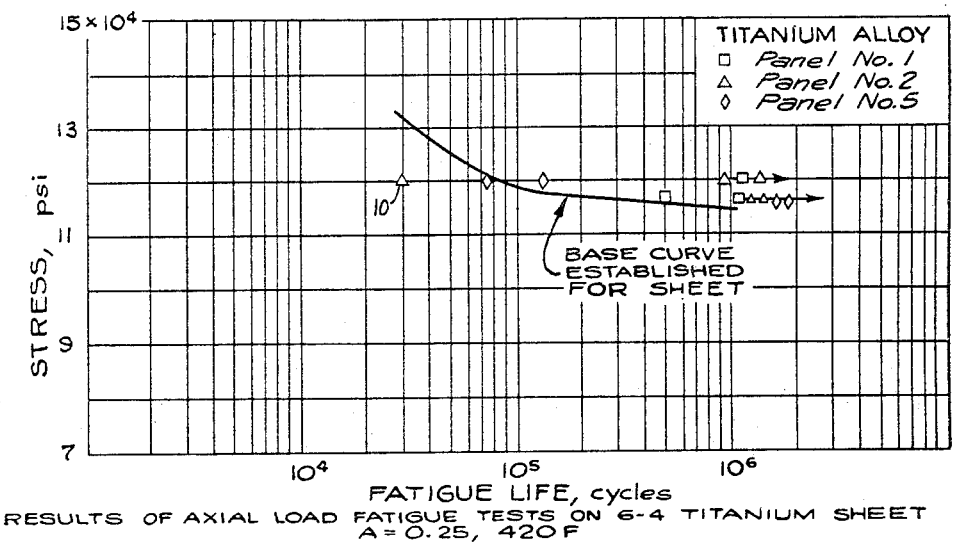
FIGURE 1 is a plot of fatigue data on Ti-6Al-4V sheet treated by the process of this invention.
Figure 2:
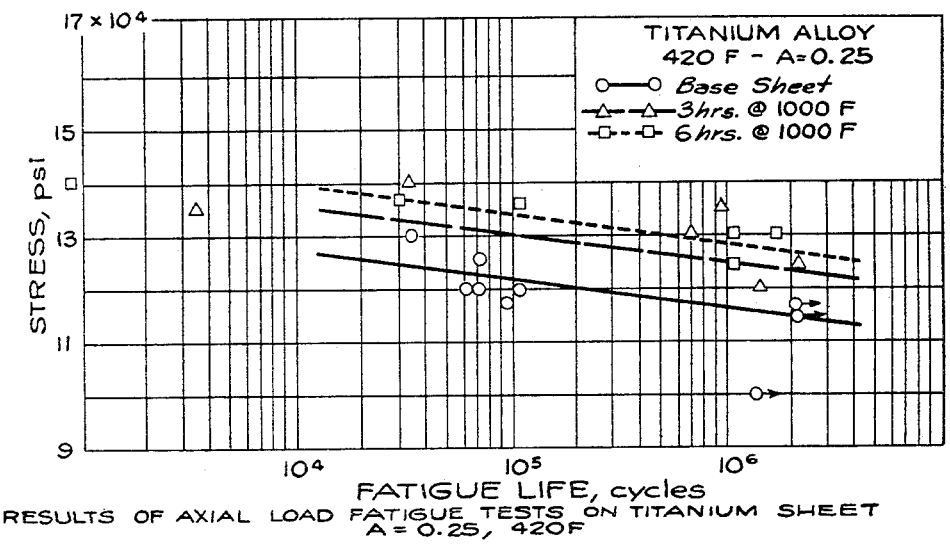
FIGURE 2 is a similar plot of fatigue data on Ti-6Al-4V sheet held at 1000° F. for 3–6 hours.

More particularly, the data in FIG. 1 show that oxidation of the surface of a Ti-6Al-4V alloy by the process of this invention does not produce the marked decrease in fatigue strength predicted by the teachings of the prior art. Similarly, the data of FIG. 2 show that titanium alloy sheet oxidized to still greater depths exhibits good fatigue strength, contrary to the teachings of the prior art.

It has been found that heating a titanium alloy in air at about 900 to 1100° F. provides a surface layer of hard oxide. This layer insures longer life of articles (such as belts) which must pass over bearing surfaces. An additional and novel advantage for this process that has been found is that the coating of surface oxide does not materially affect the fatigue properties of the alloy.

An article of the invention may be produced in accordance with the present invention by initially cleaning the surface of a panel or sheet of titanium alloy with a conventional solvent vapor degreaser, after which the surface should be wiped with a commercial water detergent. The surface should then be wiped carefully with a chamois, for example, to remove hard water salts or the like which may have adhered to the surface. The panel or sheet can then be placed in any large electric heating furnace where there will be an adequate supply of air for oxidation purposes. The cleaned panel or sheet should be handled with cotton gloves, or the like, to assure that its surfaces remain clean.

When preparing and heating panels by this procedure, the thickness of the coating of hard oxide formed on the surface is a function of the temperature at which the panels are heated and the length of time of such heating. When heating the panels in this manner, it has been found that the surface changes color in accordance with the thickness of the coating of oxide or oxides that have been formed. Thus, when heating the surface of a Ti-6Al-4V alloy in a furnace of the described character at a temperature of 1000° F. 6 hours, it was found that the surface initially became a pale golden color, which then changed to a more deep golden color, and then turned to a blue color after three hours of such heating. Further heating to the full 6 hours caused a further change in the color to a dark bluish-purple color. An oxide of this depth has proved to be very satisfactory from the standpoint of surface hardness while still exhibiting good fatigue strength.

A special example of the invention was demonstrated by fatigue tests on panels of Ti–6Al–4V sheet. The tests were conducted in a direct-stress testing machine with a load ratio (alternating load/mean load) of $A=0.25$ to simulate service conditions. A normal service temperature for processing nonmetallics of 420° F. was closely controlled during each test. To determine the level of stress at which fatigue behavior becomes critical, an unwelded base panel was tested at stresses ranging from 100,000 to 130,000 p.s.i. The endurance limit or level of stress at which fatigue life becomes infinite was found at 117,500 p.s.i. Shorter lifetimes were obtained as the level of stress increased. The range of lifetimes between 117,500 p.s.i. and 120,000 p.s.i. are of interest (250,000 cycles). Fatigue tests were then conducted on three treated panels at the stress levels of interest. These panels are identified as follows:

*Weld panel No. 1.*—Composition of base panel with a transverse weld.

*Weld panel No. 2.*—Same as panel 1, but with a heavy oxide film.

*Weld panel No. 5.*—Same as panel 1, but with a light oxide film.

Variations in depth of oxide were produced by increasing the holding time during heating at about 900 to about 1100° F. or by raising the temperature to the upper limit of the 900–1100° F. range. FIG. 1 shows that the fatigue strength of the oxidized panels compared favorably with that of the base metal. In this figure, the points used to plot the base metal curve have been omitted for the purpose of clarity. In only one instance, as shown at 10, was the lifetime of an oxidized panel shorter than that for the base panel. The greater lifetime of the majority of oxidized panels are compared to the base panels demonstrates that the fatigue properties of the titanium alloy are not impaired by the oxidation process and in some instances the fatigue properties appear to have been improved. In those panels tested where welds occurred therein, such welds were machined to be flush with the panel surface so as not to affect the test results.

Additional hardness to improve the quality of the bearing surface can be obtained with a thicker coating of oxide. The effect of changes in the thickness of coating of oxide on fatigue strength of the titanium alloy sheet was demonstrated by additional fatigue tests. One sheet for samples for fatigue tests was heated to 1000° F. for 3 hours, at which time it had a blue color, and a second sheet was heated to 1000° F. for 6 hours, after which it had a deeper bluish-purple color. These sheets were again tested at 420° F. with a load ratio of 0.25. The results are shown in FIG. 2.

The fatigue behavior of both oxidized panels was excellent when compared to that for the base metal. The behavior of the oxidized panels as bearing surfaces was investigated by conducting the following tests. A babbit coated bronze screen of the type disclosed in pending application Ser. No. 314,068, filed Oct. 4, 1963, was used and an unoxidized panel was moved at a relative speed of four feet per minute against the screen under a load of 3000 p.s.i. and at a temperature of 420° F. This test was performed on a machine of the type disclosed in the aforesaid pending application Ser. No. 70,498, filed Nov. 21, 1960. Deep galling and scoring occurred at once on the surface of the panel. Next, a panel oxidized at 1000° F. for 6 hours so as to form an oxide film of about 2 microinches was tested under identical conditions and no galling or scoring was produced after 400 hours of use. These tests demonstrate that the oxidized materials have excellent bearing surfaces.

Having discovered that unique properties can be obtained when surfaces of a titanium alloy have been oxidized, further investigations were conducted to define the time-temperature parameters that can be used to form wear-resistant oxides of optimum depth on the surfaces of titanium alloy sheets, belts and the like.

Results of these investigations have shown that oxide films about 12 microinches thick have very much better wear resistance than 2 microinch oxide films, which were formed by treatment for 6 hours at 1000° F. and which were tested for wear resistance in the manner previously described. While increased oxide thickness improves wear resistance, it has been demonstrated that an upper limit of thickness of about 20 microinches exists. At greater thicknesses oxide films have been found to become nonadherent.

Oxidation kinetics predict that a 12-microinch-thick film would require more than 100 hours to form at 1000° F. However, at 1100° F. this thickness of oxide forms in 22 hours and at 1200° F., a 12 microinch oxide forms in 2.2 hours. Thus oxidation rates at 1000° F. or less normally are too slow for economical belt treatments although oxidation in the range 1100 to 1200° F. is practical.

It has been demonstrated that oxidation treatments as long as 19 hours at 1100° F. and 3 hours at 1200° F. do not significantly reduce the fatigue strength at 500° F. or the tensile strength at 75° F., as compared with material in the unoxidized condition. Treatment for 22 hours at 1000° F. reduces the fatigue strength for million cycle life only about 3,000 p.s.i. while causing no reduction in tensile properties. In contrast, oxidation for 27 hours at 1100° F. has been found to degrade fatigue strength. Although the exposure time at 1200° F. which would degrade fatigue properties was not determined, oxides formed in 6 hours at 1200° F. were nonadherent and therefore, it was demonstrated that this was an excessive time for treatment at temperatures about 1200° F.

Titanium has a strong affinity for oxygen, reacting not only to form a surface oxide but also to dissolve oxygen atoms. The rate of both oxide film formation and oxygen solution are dependent upon the reaction temperature.

In the temperature range 75° F. to about 570° F. a very thin (about 200 A.) film of oxide forms rapidly on the surface of titanium. For oxidation to continue, oxygen atoms must diffuse through this oxide film to the metal surface. However, the diffusion of oxygen is very slow at temperatures below 570° F. so that the oxidation rate is extremely slow after formation of the initial film. Oxygen diffusion into the bulk metal is negligible.

Between 570° F. and about 1200° F., the diffusion of oxygen through films and into the titanium core becomes active and the oxidation rate increases. However, below 900° F. the rate of film formation is still too slow for thick (20 microinches) films to be formed in a practical time period (less than 24 hours).

Above 1200° F., diffusion of oxygen through the oxide becomes so rapid that thick oxides are produced in less than one hour with considerable absorption of oxygen by the base metal. Also at temperatures above 1200° F. films reach a critical thickness, which results in loss of adherency, within short periods. (Film rupturing is produced by growth stresses which occur because the specific volume of $TiO_2$ is about 14 percent greater than for titanium.)

It has been found that a pronounced change occurs in the mechanical properties of titanium, particularly hardness and ductility, when oxygen is absorbed. There is a progressive loss of tensile and fatigue strengths eventually leading to a brittle fracture mode. A tendency for brittle fracture may also be produced by thick, adherent oxide films on the titanium surface since cracks may nucleate in the hard oxide and propagate into the base metal.

Based on the above findings and considerations, it has been concluded that useful oxide films should be formed by treatments within the temperature range 900° F. to about 1200° F.

Specific examples of the invention were demonstrated by preparing test specimens from a sheet of Ti-6Al-4V, identified as Sheet No. 109, in the millannealed temper. Such specimens were prepared by washing them with a detergent soap followed by rinsing in hot water and then in acetone. Rubber gloves used for handling clean material to prevent formation of nonuniform oxide films resulting from fingerprints on the surface and to prevent chloride-ion stress corrosion.

Oxidation treatments were conducted in an electrically heated, forced-air furnace. Temperatures were controlled within ±8° F. and were monitored by thermocouples in contact with the specimens.

Oxide thickness was calculated for all fatigue specimens from the weight gained during oxidation, assuming the oxide formed was $TiO_2$ (density=69.82 g./in.$^3$). Measurement of weights was made using a precision balance, accurate to 0.00001 gram. Specimen surface areas used in the calculation of oxide thicknesses were computed from micrometer and polar planimeter measurements.

Adherency of oxide films was evaluated by bending oxidized specimens in a 75-degree V-shaped die and successively increasing the bend severity by using male dies of progressively decreasing radii. Tendency of films to spall was observed after bending over each die.

The hardness of oxides was evaluated using the Mohs scratch hardness test. Oxides were progressively abraded with minerals constituting the Mohs hardness scale until the mineral was found which scratched the oxide. The hardness of the oxide was less than that of the mineral which scratched it.

The wear resistance of oxide films was evaluated by determining the cycles required to rupture films when a ball, under an applied stress, was slid over the oxidized surfaces. Coefficients of friction between the oxides and the wear balls were also determined. Specimens were evaluated at both room temperature and at 500° F. using hardened-steel and tungsten-carbide balls.

In operation, the wear test apparatus moved specimens back and forth under the loaded ball. Specimens were oirented so that tracks were made in the direction of grind marks. Several sets of tracks were made on each specimen, using different test conditions. Rate of movement was 0.8 foot per minute and the length of wear tracks was about 0.4 inch for both the ½-inch-diameter steel ball and the ¼-inch-diameter tungsten carbide ball.

Friction forces between the balls and oxides were measured with a calibrated spring connected to a linear differential transformer. Coefficients of friction were calculated as the quotient of the frictional force between the ball and oxide divided by the normal force applied to the ball.

Rupture of oxide films was detected by abrupt changes in the magnitude of the frictional force as well as by current flow in a circuit connecting the ball with an unoxidized area on the titanium alloy specimen. (Because of the high dielectric strength of the oxide films, electrical conductivity between the ball and specimen core will not occur until the oxide is ruptured.)

Fatigue tests were conducted on a Krouse, direct-stress testing machine, operating with a frequency of 1675 cycles per minute. A load ratio A (alternating load/means load) of 0.25 and a temperature of 500° F. were maintained during each test.

Tension tests were conducted at room temperature using a Baldwin tensile machine. Strain rates were 0.005 in./in./minute to the yield point and 0.05 in./in./minute from the yield point to fracture.

Oxidation kinetics

Figure 3:
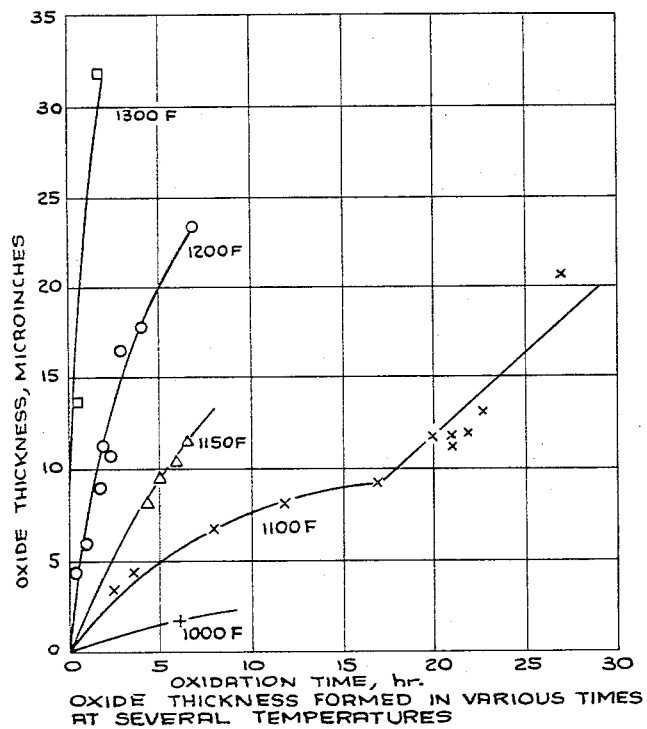
FIGURE 3 is a plot of thickness of oxide films formed on Ti-6Al-4V sheet treated by the process of this invention.
Figure 4:
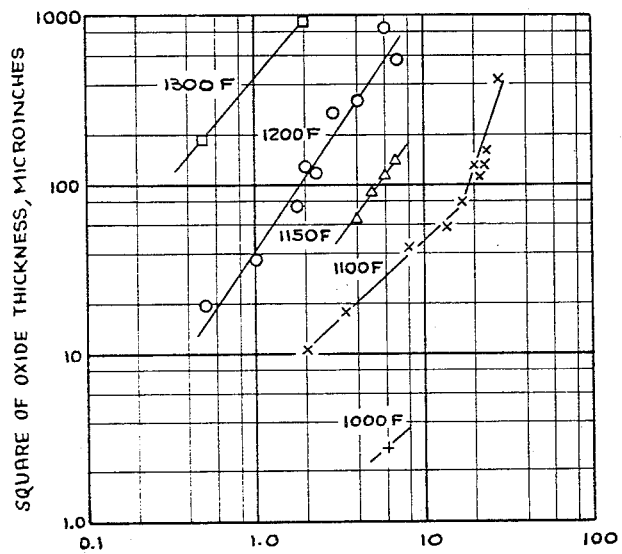
FIGURE 4 is a similar plot of the square of the oxide thickness measured at various temperatures.

The thickness of oxide films formed on the test specimens heated 1100, 1150, 1200 and 1300° F. in air, are plotted in FIG. 3 as a function of the exposure time. Convex deviation of the plot of oxide thickness versus oxidation time from a straight line, as shown in FIG. 3, indicated that the presence of an oxide film inhibits further oxidation. A better fit of the data to a straight line was achieved by plotting the square of the oxide thickness versus the oxidation time as shown in FIG. 4. The straight line behavior in FIG. 4 suggests that the oxidation kinetics of Ti-6Al-4V follow a parabolic rate law.

The oxidation rate at 1000° F. is too slow to form thick oxides, such as 12 microinches, in the time periods of interest (2 to 24 hours). On the other hand, the oxidation rates between 1200 and 1300° F. are too fast to permit good control of oxide thickness during commercial processing. Thus from the oxidation-kinetic viewpoint, oxidation treatments in the temperature range of 1100 to 1200° F. appear most useful.

The sharp increase in the oxidation rate at 1100° F. which occurred at a film thickness of about 9 microinches suggested that the film ruptured allowing oxygen greater access to the metal surface. However, no such change in the rates of oxidation after formation of 9 microinch oxides was observed for oxidation at 1150 or 1200° F.

It should be noted that the oxide thicknesses calculated from weight measurements may be as much as 15 percent greater than actual thicknesses since some unknown portion of oxygen, all of which was assumed to be in the oxide, was absorbed by the metal.

Oxide adherency

Loss of adherency or the tendency of oxide films to flake off was investigated to shed some light on the rate change observed during oxidation at 1100° F. as well as to define the thickness limits of adherent oxides. The results of bend tests to determine the tendency of oxides to spall are given in Table 1.

TABLE 1.—ADHERENCE OF OXIDES FORMED BY VARIOUS TREATMENTS

| Oxidation Treatment | | Oxide Thickness, microinches | Minimum Bend Radius, inch | Oxide Adherence[a] |
|---|---|---|---|---|
| Time, hours | Temperature, ° F. | | | |
| 3.4 | 1,100 | 4.2 | 0.062 | A |
| 8 | 1,100 | 6.4 | 0.049 | A |
| 20 | 1,100 | 11.5 | 0.094 | A |
| 22 | 1,100 | 11.6 | 0.094 | A |
| 27 | 1,100 | 20.9 | 0.125 | NA |
| 4 | 1,150 | 8.0 | 0.094 | A |
| 5 | 1,150 | 10.4 | 0.094 | A |
| 6.8 | 1,150 | 11.8 | 0.094 | A |
| 1.8 | 1,200 | 8.5 | 0.062 | A |
| 2.3 | 1,200 | 12.8 | 0.094 | A |
| 3 | 1,200 | 16.5 | 0.094 | A |
| 6 | 1,200 | 28.7 | 0.375 | NA |
| 0.5 | 1,300 | 13.6 | 0.094 | NA |
| 2 | 1,300 | 31.7 | 0.375 | NA |
| 6 + 6 | 1,000 1,150 | 13.4 | 0.094 | A |

[a] A=oxide was adherent at minimum bend radius indicated; NA=oxide was nonadherent, flaking at bend radius indicated.

The bend test data in Table 1 indicate that oxide films of greater thickness than about 20 microinches are nonadherent, also, oxides formed at 1300° F. are nonadherent at a thickness of 14 microinches.

Hardness of oxides

Because the hardness of oxides may effect wear resistance, the Mohs scratch hardness of oxides was measured to determine if oxide hardness is affected by the oxidation treatment. Results of the hardness measurements showed that titanium oxides have a Mohs scratch hardness of 7 to 7½. A Mohs hardness of 7 to 7½ indicates that titanium oxide is slightly harder than the mineral quartz. However, it is softer than aluminum oxide (Mohs hardness of about 8½).

Wear resistance of oxides

Results of wear tests on unoxidized Ti-6Al-4V Sheet No. 109 and on samples of Sheet No. 109 oxidized for 6 hours at 1000° F., 22 hours at 1100° F., and 2.3 hours at 1200° F. are given in Table 2. Thicknesses of the oxides formed on wear test specimens at 1000, 11000, and 1200° F. were 1.7, 12, and 12.8 microinches, respectively.

Figure 6:
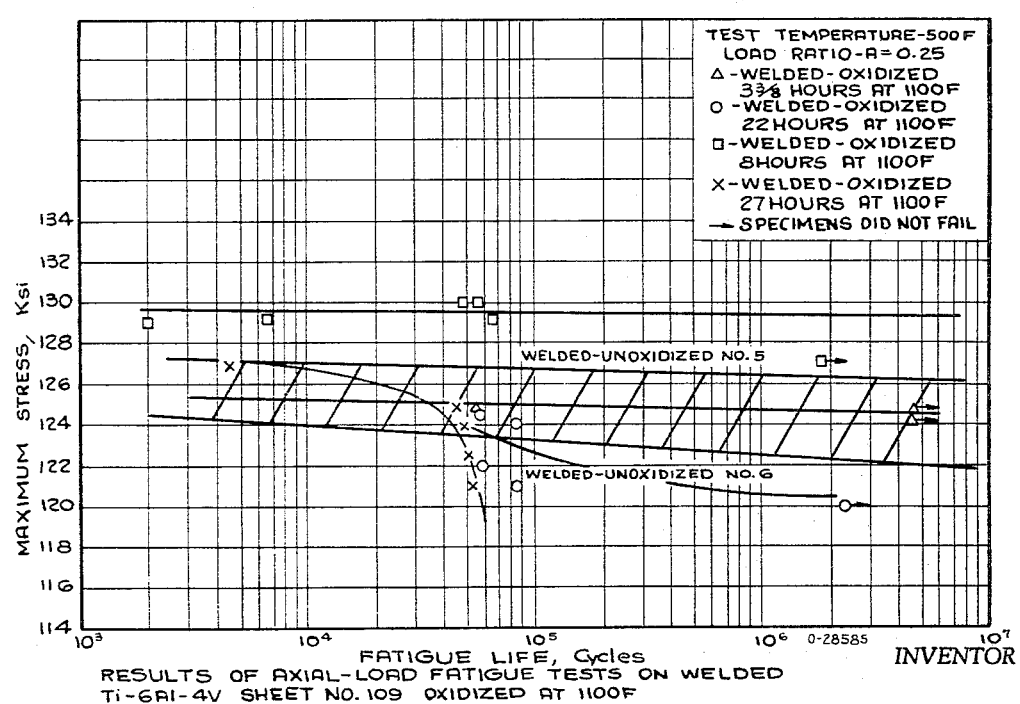
FIGURE 6 is a similar plot of fatigue data on Ti-6Al-4V sheet held at 1100° F. for 3⅜ to 27 hours.

Results showing the effect of oxidation at 1100° F. on the fatigue behavior of welded specimens are given in FIG. 6.

TABLE 2.—RESULTS OF WEAR TESTS ON Ti-6Al-4V SHEET NO. 109

| Specimen Identification | Wear Track No. | Ball Material | Test Temperature, °F. | Load on Ball, g. | Contact Stress, K s.i. | Dynamic Coefficient of Friction | | Total Number of Passes | Comments |
|---|---|---|---|---|---|---|---|---|---|
| | | | | | | Initial | Final | | |
| Unoxidized Ti-6Al-4V | 1 | WC | 500 | 150 | 80 | 0.4 | 0.5 | 2,670 | Seized and galled. |
| | 2 | WC | 500 | 150 | 80 | 0.4 | 0.4 | 1,830 | Do. |
| | 3 | Steel | 500 | 150 | 50 | 0.42 | 0.51 | 2,040 | Do. |
| | 4 | ..do | 500 | 150 | 50 | 0.44 | 0.65 | 1,620 | Do. |
| | 5 | WC | 75 | 150 | 80 | 0.45 | 0.45 | 925 | Do. |
| | 6 | Steel | 75 | 150 | 50 | 0.47 | 0.47 | 560 | Do. |
| 1.7-microinch oxide formed in 6 hours at 1,000° F. | 1 | Steel | 75 | 71 | 38 | 0.23 | 0.78 | (a) 1,350 | Ruptured. |
| | 2 | WC | 75 | 71 | 61 | 0.3 | 0.44 | (a) 1,920 | Do. |
| | 3 | WC | 500 | 71 | 61 | 0.44 | 0.44 | (a) 8 | Do. |
| | 4 | WC | 500 | 71 | 61 | 0.44 | 0.44 | 1 | Do. |
| | 5 | Steel | 500 | 71 | 38 | 0.45 | 0.49 | (a)19 | Do. |
| | 6 | ...do | 500 | 71 | 38 | 0.49 | 0.49 | 1 | Do. |
| 12-microinch oxide formed in 22 hours at 1,100° F. | 1 | WC | 500 | 150 | 80 | 0.28 | 0.85 | 2,530 | Did not rupture. |
| | 2 | WC | 500 | 150 | 80 | 0.39 | 1.0 | 1,960 | Do. |
| | 3 | Steel | 500 | 150 | 50 | 0.60 | 0.63 | 1,920 | Do. |
| | 4 | ..do | 75 | 150 | 50 | 0.77 | 0.77 | 1,280 | Do. |
| | 5 | WC | 75 | 150 | 80 | 0.21 | 0.47 | 1,120 | Do. |
| 12.8 microinch oxide formed in 2.3 hours at 1,200° F. | 1 | Steel | 500 | 34 | 30 | 0.47 | 0.65 | 1,440 | Did not rupture. |
| | 2 | ..do | 500 | 81 | 40 | 0.35 | 0.57 | 932 | Do. |
| | 3 | ..do | 500 | 81 | 40 | 0.6 | 0.69 | 1,600 | Do. |
| | 4 | ..do | 500 | 150 | 50 | 0.57 | 0.57 | 1,400 | Do. |
| | 5 | WC | 500 | 150 | 80 | 0.17 | 0.9 | 1,800 | Do. | a Oxide partially ruptured on first pass.

Wear tests on unoxidized Ti-6Al-4V Sheet No. 109 showed seizing and galling behavior for contact with both the tungsten carbide and the steel ball. Damage to the unoxidized sheet, caused by galling during the wear tests emphasizes the need for a wear-resistant coating on the Ti-6Al-4V belts, which undergo sliding contact with steel and Phosphor bronze during operation of a press such as is disclosed in the aforesaid application Ser. No. 70,498.

The 1.7-microinch oxide formed during 6 hours at 1000° F. had poor wear resistance, especially at 500° F., when compared with specimens having substantially thicker oxide films. At 500° F. the oxide partially ruptured during the first wear pass, for all tests of the 1.7-microinch oxide, and was completely penetrated in less than 20 cycles under contact stresses as low as 38K s.i. Partial rupture of the 1.7-microinch oxide also occurred during the first pass for all tests at 75° F. However, at 75° F. the resistance of the oxide to complete rupture was better than at 500° F. As shown in Table 2, complete breakthrough at 75° F. did not occur before 1350 passes under the contact stress of 38K s.i.

The 12-microinch oxides formed at 1100 and 1200° F. did not rupture during sliding contact with either the tungsten-carbide or the steel ball. As shown in Table 2 as many as 2530 passes were made on the 12-microinch oxides using the tungsten-carbide ball under a stress of 80K s.i. while up to 1920 passes were made with the steel ball under a stress of 50K s.i.

FATIGUE PROPERTIES

Figure 5:
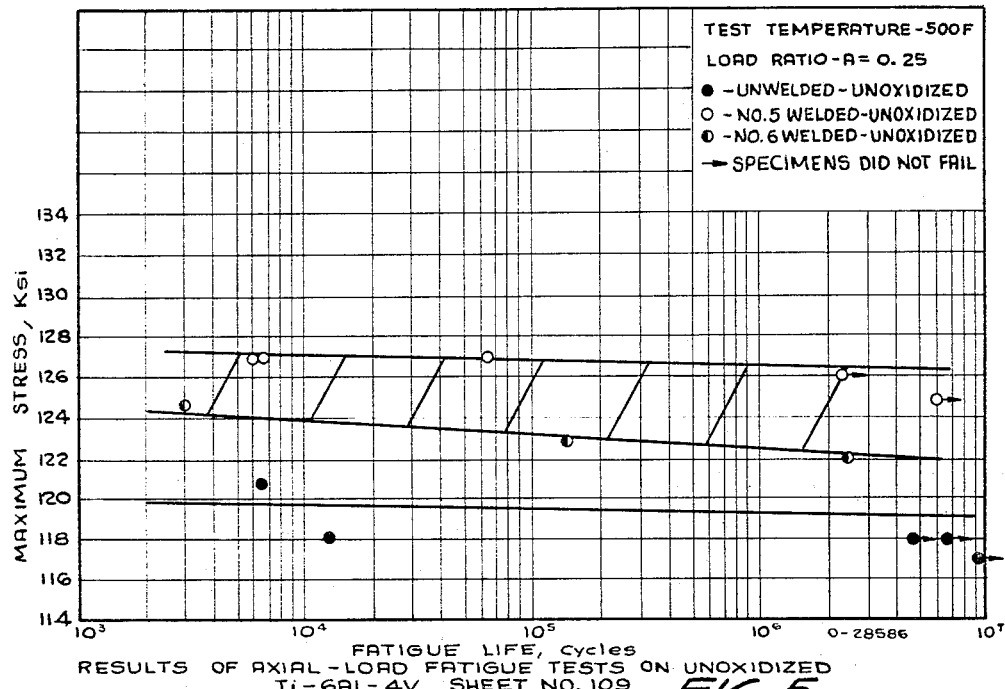
FIGURE 5 is a plot of fatigue data on unoxidized Ti-6Al-4V sheet.

Initial fatigue studies defined the behavior of unwelded and welded specimens from Sheet No. 109 in the unoxidized condition. The results, plotted in FIG. 5, showed that the fatigue strength at 500° F. of welded specimens was greater than for unwelded specimens. Welded samples had endurances in excess of a million cycles under stresses to 126K s.i. while unwelded samples failed within a million cycles under stresses above about 120K s.i.

Differences in fatigue strength appeared for the two welds tested Nos. 5 and 6, apparently as the result of differences in weld strength arising from welding variables such as cooling rate and air contamination. Thus a strength band (cross hatched in FIG. 8) resulted for the welded, unoxidized condition.

Thicknesses of oxide films produced on fatigue specimens by oxidation at 1100° F. are given below:

| Oxidation Time, Hours | Average Oxide Thicknesses, Microinches | Range of Thickness on Six Specimens, Microinches |
|---|---|---|
| 3.4 | 4.2 | 3.9-4.7 |
| 8 | 6.4 | 6.2-6.6 |
| 22 | 11.2 | 10.2-12.3 |
| 27 | 20.9 | 18.1-22.8 |

As there shown, oxidation for 3.4 hours at 1100° F. did not significantly alter the fatigue strength of welded specimens but did reduce differences in fatigue strength observed between welds 5 and 6.

Oxidation for 8 hours at 1100° F. was found to have raised the fatigue strength about 3.5K s.i. and also to have reduced strength differences between welds 5 and 6.

Oxidation for 22 hours at 1100° F. altered the fatigue behavior and slightly reduced the fatigue strength of welded specimens. As shown in FIG. 6, the endurance life of 22 hour oxidized specimens is within the baseline band at stresses above 123K s.i., but falls slightly below the baseline at lower stresses.

Oxidation for 27 hours at 1100° F. grossly altered the fatigue behavior and caused a general degradation in strength. As shown in FIG. 6, 27 hour-oxidized specimens failed in 55,000 cycles at a stress of 120K s.i. but had an endurance of 45,000 cycles at a stress of 125K s.i. The degradation in fatigue strength after 27 hour-oxidation appears to have been due to the onset of embrittling effects as a result of oxygen diffusing into the titanium. To determine if the 3.5K s.i. improvement in fatigue strength, resulting from the 8 hour-oxidation treatment, could be attributed to the presence of the oxide film or was the result of metallurgical changes during the thermal exposure, samples heated in argon (no oxidation) for 8 hours at 1100° F. were evaluated. The results, compared with the behavior of specimens oxidized for 8 hours at 1100° F., are given in FIG. 7.

Figure 7:
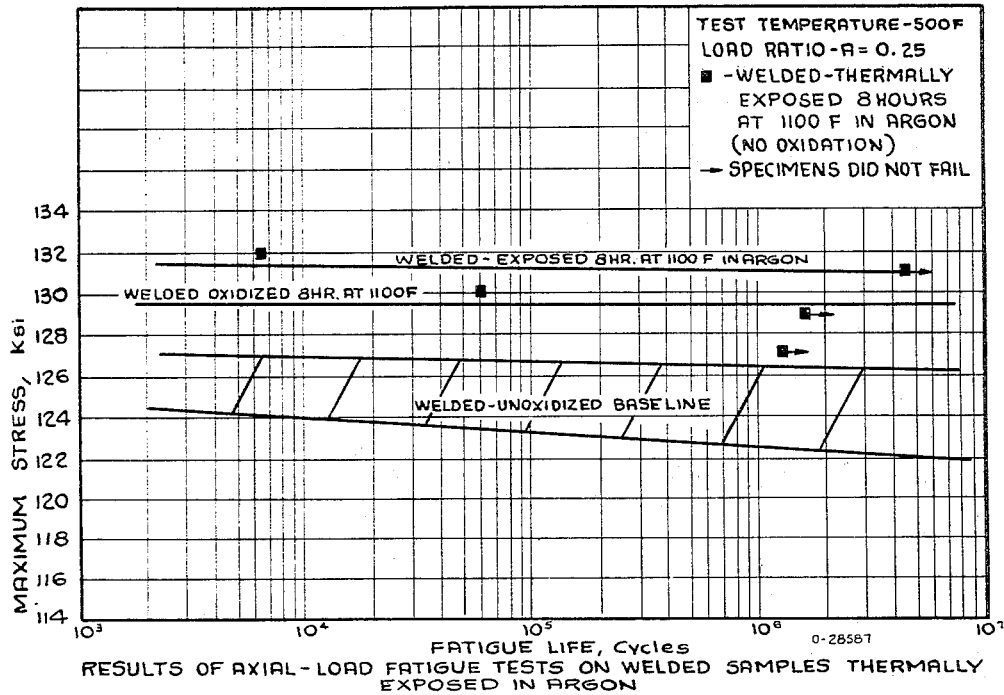
FIGURE 7 is a similar plot of fatigue data on Ti-6Al-4V sheet held at 1100° F. for 8 hours in argon (no oxidation)

As shown in FIG. 7, the fatigue strength of thermally expose dsamples, unoxidized was about 2K s.i. greater than for 8 hour-oxidized specimens and about 5K s.i. above as-welded specimens. Thus relief of residual stresses and/or increased strength resulting from age hardening during 8 hours at 1100° F. significantly improved fatigue strength and oxidation for 8 hours caused only a slight degradation in the strength gained.

Figure 8:
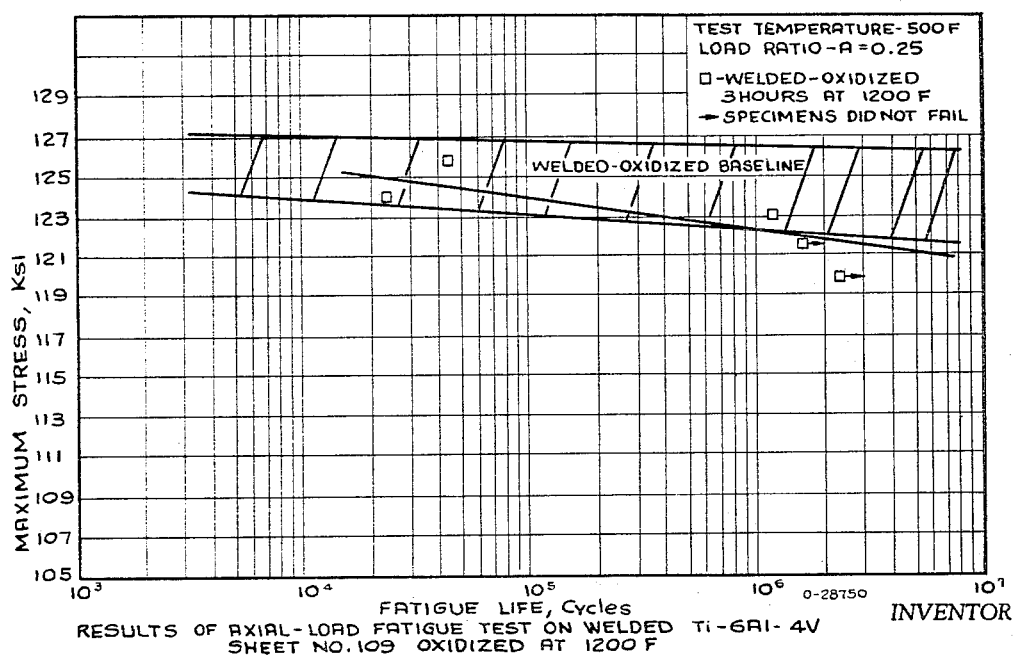
FIGURE 8 is a similar plot of fatigue data on Ti-6Al-4V sheet held at 1200° F. for 3 hours.

The effects on fatigue properties of oxidation at 1200° F. for 3 hours is shown in FIG. 8.

Thicknesses of oxide films formed on the fatigue specimens oxidized at 1200° F. are given below:

| Oxidation Time, Hours | Average Oxide Thicknesses, Microinches | Range of Thickness on Six Specimens, Microinches |
|---|---|---|
| 2.3 | 11.6 | 10.8-12.8 |
| 3 | 17.4 | 16.3-19.4 |

As shown in FIG. 8 specimens oxidized for 3 hours at 1200° F. had fatigue strength as good as baseline.

TENSILE PROPERTIES

Results of room-temperature tensile tests on unwelded specimens showed that oxidation at 1100° F. for periods to 27 hours did not reduce strength or ductility. In fact as shown in Table 3, the strength of specimens oxidized at 1100° F. was slightly greater than for unoxidized samples. This increased strength appears to be the result of age hardening during heating for oxidation.

TABLE 3.—ROOM-TEMPERATURE TENSILE PROPERTIES OF Ti-6Al-4V SHEET NO. 109

| Specimen Orientation [a] | Ultimate Tensile Strength, K s.i. | 0.2 Percent Yield Strength, K s.i. | Elongation in 1 Inch, Percent | Reduction in Area, Percent |
|---|---|---|---|---|
| Unwelded—Unoxidized | | | | |
| A | 149.4 | 138.9 | 14 | 26 |
| L | 150.9 | 137.2 | 14 | 34 |
| T | 151.9 | 137.7 | 11 | 27 |
| Unwelded—Oxidized 3.4 Hours at 1,100° F. | | | | |
| A | 155.7 | 146.6 | 15 | 21 |
| L | 160.2 | 146.6 | 14 | 24 |
| T | 159.3 | 143.4 | 13 | 19 |
| Unwelded—Oxidized 8 Hours at 1,100° F. | | | | |
| A | 161.0 | 147.9 | 14 | 23 |
| L | 159.0 | 146.8 | 13 | 18 |
| T | 154.1 | 146.6 | 15 | 18 |
| Unwelded—Oxidized 22 Hours at 1,100° F. | | | | |
| A | 153.8 | 144.8 | 13 | 24 |
| A | 154.4 | 144.8 | 15 | 32 |
| Unwelded—Oxidized 27 Hours at 1,100° F. | | | | |
| A | 156.7 | 144.5 | 14 | 25 |
| L | 157.0 | 144.8 | 12 | 25 |
| T | 155.7 | 146.6 | 15 | 21 |
| Unwelded—Oxidized 2.3 Hours at 1,200° F. | | | | |
| A | 152.3 | 140.6 | 12 | 24 |
| A | 152.3 | 141.7 | 13 | 26 |

[a] Direction of stress axis indicated as follows:
A = Angled 15° from longitudinal direction.
L = Longitudinal.
T = Transverse.

Results of tensile tests given in Table 3 for specimens of three orientations, (A) angled 15° from the longitudinal sheet direction, (L) longitudinal, and (T) transverse show that properties were nearly isotropic and directionality was not accentuated by oxidation.

The advantage of a hard surface on the titanium alloy is reflected in the improved service life of the alloy when it is continually used as a bearing surface. The novelty of the invention lies in the unique combination of properties that has been discovered. The process of heating an alloy of titanium provides a hard surface by oxidation and at the same time permits the retention of fatigue strength characteristic of softer untreated alloys of titanium. As will be apparent to those skilled in the art, proper regulation of the treatment used to provide the hard surface can provide a wide variety of hardnesses and degrees of improved resistance to wear with no sacrifice in fatigue strength. Catastrophic failures resulting from fatigue failure of the hardened materials operating at high levels of stress are avoided.

It will be understood that this invention is not limited to treatment of an alloy of titanium containing only about six percent of aluminum and about four percent of vanadium but is applicable to alloys of titanium in general.

Having thus described my invention, I claim:

1. A method of treating an article formed from a Ti-6Al-4V alloy comprising heating said article in an oxidizing atmosphere at 900 to 1200° F. for a time sufficient to form a surface layer of oxide of titanium, of 2 to 20 microinches in thickness, adherent to the subsurface.

2. A method as claimed in claim 1, in which the article is heated at a temperature of 1100 to 1200° F. for a time sufficient to form an oxide layer of about 12 microinches in thickness.

3. A method as claimed in claim 1, in which the oxidizing atmosphere is air.

4. A method as claimed in claim 3, in which the article is heated at any one of the temperatures of 1200° F., 1150° F. and 1100° F. for the times of 2.2 hrs., 7 hrs. and 22 hrs., respectively.

5. A method of imparting surface hardness to an article formed from a Ti-6Al-4V alloy which comprises heat-treating the article in air at a temperature in the range of 900 to 1200° F. sufficient to lead to a formation of a surface layer of oxide of titanium on the article without substantially impairing the fatigue strength of the metal as compared with the fatigue strength of a similar article not so treated, and for a time sufficient for formation of a surface layer of oxide of 2 to 20 microinches in thickness, adherent to the subsurface.

6. A sheet of a Ti-6Al-4V alloy bearing an adherent surface layer of oxide of titanium from 2 to 20 microinches in thickness, being as fatigue resistant as unoxidized sheet of the same material and such layer having a hardness of at least 7 on the Mohs scale.

7. A sheet as claimed in claim 6, wherein the surface layer is about 12 microinches thick.

8. A sheet as claimed in claim 7, wherein said sheet is in the form of a continuous belt.

References Cited

UNITED STATES PATENTS

| | | | |
|---|---|---|---|
| 2,804,407 | 8/1957 | Wallace | 148—6.3 X |
| 2,864,732 | 12/1958 | Miller et al. | 148—31.5 X |
| 2,881,105 | 4/1959 | Gullett | 148—6.3 |
| 3,069,259 | 12/1962 | Margolin et al. | 75—175.5 |

FOREIGN PATENTS 555,952  4/1958  Canada.

OTHER REFERENCES

American Machinist, June 11, 1951, pp. 147, 148.
Handbook on Titanium Metal, 7th ed., August 1953, Titanium Metals Corp. of America, page 34.

RALPH S. KENDALL, *Primary Examiner.*

UNITED STATES PATENT OFFICE
CERTIFICATE OF CORRECTION

Patent No. 3,408,236            October 29, 1968

Carroll H. Van Hartesveldt

It is certified that error appears in the above identified patent and that said Letters Patent are hereby corrected as shown below:

Column 1, line 36, "metalic" should read -- metallic --. Column 3, line 7, "special" should read -- specific --; line 40, "are" should read -- as --. Column 5, line 8, after "gloves" insert -- were --; line 43, "oirented" should read -- oriented --. Column 6, line 25, after "weight" insert -- gain --; TABLE 1, fourth column, line 2 thereof, "0.049" should read -- 0.094 --. Column 7, line 2, "11000" should read -- 1100 --. Column 8, line 56, "expose dsamples" should read -- exposed samples --; line 75, "F%." should read -- F. --. Column 10, line 42, claim reference numeral "7" should read -- 6 --.

Signed and sealed this 3rd day of March 1970.

(SEAL)

Attest:

Edward M. Fletcher, Jr.            WILLIAM E. SCHUYLER, JR.

Attesting Officer            Commissioner of Patents